United States Patent Office 3,501,427
Patented Mar. 17, 1970

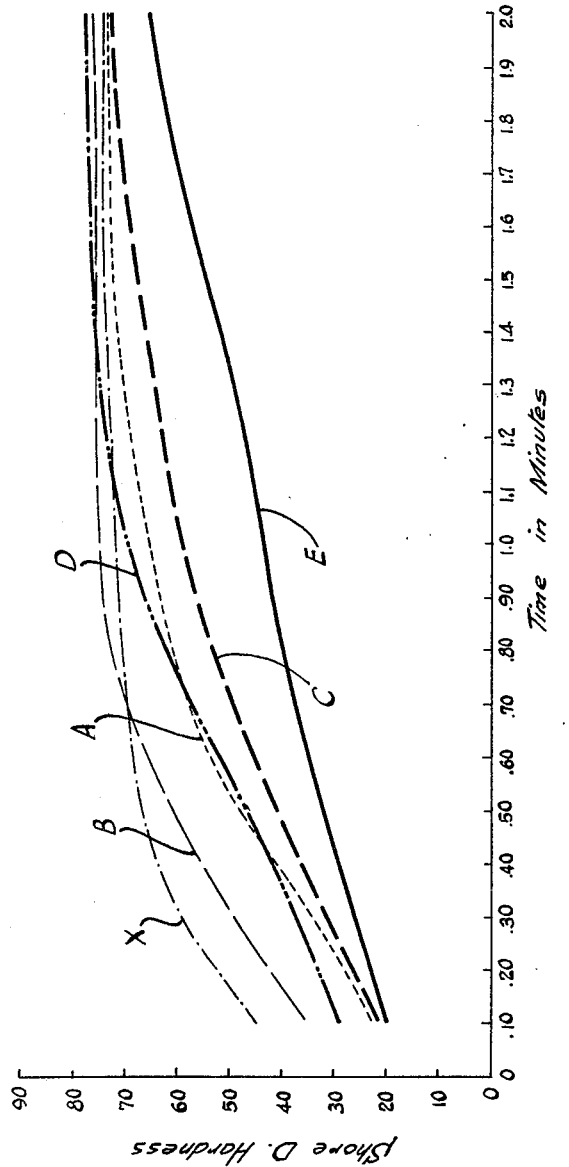

3,501,427
THERMOPLASTIC SPLINTS COMPRISING VINYL CHLORIDE VINYL ACETATE COPOLYMER AND EPOXIDIZED OIL
Martin I. Edenbaum, Somerset, N.J., assignor to Johnson & Johnson, a corporation of New Jersey
Filed Apr. 21, 1966, Ser. No. 544,261
Int. Cl. C08f 45/50, 45/36
U.S. Cl. 260—23
8 Claims

ABSTRACT OF THE DISCLOSURE

Thermoplastic resin sheets formed of plasticized vinyl chloride vinyl acetate copolymers are utilized for forming casts and the like in immobilizing body members. The length of time during which the materials remain moldable, after being heated to a moldable state, is substantially lengthened through the inclusion of a monomeric solid plasticizer and a small amount of epoxidized olefinic oil.

---

This invention relates to moldable orthopedic splints of the type which are hard and rigid at room temperature but assume a temporary moldable or plastic state when heated above a temperature which is substantially above room and body temperatures.

Thermoplastic splints of the type described above in the form of relatively thin sheets, strips, or the like, and comprising a vinyl polymer plasticized with from 10% to 25% triphenyl phosphate or dicyclohexyl phthalate have been proposed in U. S. Pat. 2,385,879 to Patton. In practice, splints of this type would be heated to a temperature at the upper limits of the range of temperatures at which they are soft and moldable but retain internal cohesive strength, cooled if necessary to a temperature which would not cause discomfort to the patient, cut and shaped to conform to the area of the body requiring support and are then allowed to cool to form a hard and rigid cast. The length of time during which the attending physician may suitably cut the splint and shape it to conform to the contours of the body is limited to the length of time required for the softened heated thermoplastic material to cool to the tempertaure at which it hardens.

It is therefore desirable to provide splints of this type which are moldable in the broadest possible range of temperatures. The softening temperature of the splint should therefore be only slightly above the maximum of room and body temperatures and temperatures likely to be encountered in normal use. However, despite this low softening point, the splint must be hard and rigid at the maximum temperatures encountered during use so that the same is not deformed when pressure is exerted on the splint by the immobilized body member. In addition, to provide the broadest possible moldable range, the softened splint should retain sufficient internal cohesive strength to remain moldable up to temperatures of about 165° F., that is, the maximum temperatures tolerable by the human body.

The proposed prior art thermoplastic splints have been generally unsatisfactory in that they assume a moldable state in only a relatively narrow range of temperatures, the softening temperature either being too high and therefore relatively close to the upper limits of human tolerance and/or the temperature at which the splints lose their internal cohesiveness and therefore above which they should not be heated being too low, that is, substantially below the upper limits of human tolerance. As a result, a limited amount of time, as little as 20 seconds or less, has been available to properly cut, shape and mold the splint.

This limiting characteristic of prior art splints is best understood by reference to the appended graph and particularly to curves A and B. Curve A is a typical Shore D hardness versus time curve for a 120-mil thick calendered sheet consisting of 72 parts by weight of a vinyl resin, hereinafter more fully described, and 11 parts by weight of triphenyl phosphate monomeric solid plasticizer which is heated in a 165° F. oven to render the same moldable and then removed from the heat source and used at room temperature, i.e. from about 68° F. to about 72° F. Zero time on the graph represents the moment of removal from the heat source. Since such a thermoplastic sheet becomes essentially unmoldable when its Shore D hardness exceeds about 50 or 55, it can be seen that the doctor has only about 30 seconds to properly shape the splint and apply it to the patient.

Curve B is a similar typical Shore D hardness versus time curve for an approximately 120-mil thick calendered sheet consisting of 72 parts by weight of the same vinyl resin and 11 parts by weight of dicyclohexyl phthalate, the splint being moldable for only about 20 seconds after removal from the 165° F. heat source.

Within the teaching of the patent to Patton, it is not possible to provide splints with a broader softening range. If additional solid monomeric plasticizer is added to the thermoplastic composition to lower point at which the splints become moldable, it is found that the splints then lose their internal cohesiveness at substantially lower temperatures. Thus, the attempt to broaden the softening range is self defeating. In addition, splints made according to the teaching of Patton having the lower softening point are not sufficiently hard and rigid at room temperature to withstand the stress of use.

It is therefore an object of this invention to provide a plasticized polyvinyl thermoplastic splint which is rigid and hard at room temperature but is moldable in a broader range of temperatures below the limits of human tolerance than comparable prior art splints utilizing the same basic vinyl resins and basic plasticizer, and to thus provide the physician with a substantailly lengthened period of time to shape and apply the splint after it is removed from a heat source.

It has now been discovered that this object may be attained and the heretofore described deficiencies of prior art thermoplastic splints substantially eliminated by fabricating the splints of at hermoplastic material comprising a plasticized vinyl polymer of the type previously suggested by Patton in which small amounts, on the order of from about 2 to about 6 and preferably about 4 parts by weight per 100 parts by weight of plasticized resin, of the monomeric solid plasticizer is replaced by a liquid epoxidized olefinic oil. According to this invention a 120-mil thick thermoplastic splint is provided which is hard and rigid at room temperature, which when heated to temperatures substantially above room temperature assumes a softened and moldable but internally cohesive state, and which when removed from a 165° F. heat source and used at room temperature affords the attending physician from 50% to 225% more time to shape and apply the splint than do prior art splints.

The effect of replacing small amounts of the monomeric solid plasticizer with a liquid epoxized olefinic oil can be seen by again referring to the attached graph. Curve C is a typical Shore D harness versus time curve for a 120-mil thick calendered sheet of the same plasticized vinyl composition formulated on laboratory scale equipment as that represented by curve A, except that 3 parts of the triphenyl phosphate monomeric solid plasticizer has been replaced by a liquid epoxidized olefinic oil. It can be seen that when the sheet is heated as previously described and removed from the heat source, about 45 seconds is available to cut, shape, and apply the splint before its hardness reaches about 55 and it becomes essentially unmoldable. In other words, the molding time is increased by about 50%. Thus, the addition of the liquid epoxidized olefinic oil essentially flattens out the hardness versus time curve and broadens the range of moldability without materially affecting the hardness of the splint at room temperature or its internal cohesiveness at the upper limits of human tolerance.

Curve D represents a similar hardness versus time curve for a sheet having the same plasticized vinyl resin of curve B except that 3 parts of the dicyclohexyl phthalate has been replaced with the liquid epoxidized olefinic oil to increase the time available to shape the splint by 100%.

This increase in the length of time that the splints are moldable is especially surprising in light of curve X of the attached graph which represents a vinyl formulation utilizing the same vinyl resin as used above in which all of the monomeric solid plasticizer has been replaced by the liquid epoxidized olefinic oil, the length of time the splint is moldable being actually reduced 30 to 60% or to a time factor of 10 seconds or less.

Even more dramatic improvements in the moldable properties of the splints can be obtained when the plasticized vinyl composition is formulated on production scale equipment as opposed to the laboratory scale compounding represented by curves C and D. Curve E represents a splint utilizing the same thermoplastic composition as that of curve C but which was produced in large production scale batches. While it is not intended to restrict the application to a particular theory, it is thought that due to the small amounts of epoxidized olefinic oil utilized, laboratory scale compounding does not result in a thorough mixing of the various components. The prototype splint made from this production scale batch of compounded vinyl resin when heated as previously described and then removed from the heat source remains moldable for about 1.35 minutes, or more than 240% longer than the comparable splint (represented by curve A) in which small amounts of the monomeric solid plasticizer has not been replaced by the epoxidized olefinic oil.

While any of the polymeric materials usually referred to as the vinyl polymers may be used as the base thermoplastic resin for the splints of this invention, copolymers of vinyl chloride and vinyl acetate, particularly those having a polyvinyl chloride content of from about 70% to about 90% or more have been found to be particularly suitable. It is also generally desirable that the vinyl polymer have an average molecular weight of from about 5,000 to 20,000.

The monomeric solid plasticizer used in conjunction with the vinyl base resin may, in addition to the triphenyl phosphate and dicyclohexyl phthalate previously described, be any solid monomeric plasticizer which when added to the vinyl resin naturally lowers the melting point of the vinyl and thus increases its moldability without so softening or reducing the internal cohesiveness of the vinyl at room temperature to preclude its use as a hard and rigid cast. Many such plasticizers would be known to those skilled in the art.

The amount of plasticizer employed will vary depending on the plasticizer used but in general amounts of from about 5% to about 25% by weight of the total weight of the vinyl and monomeric solid plasticizer is necessary to secure the desired thermoplastic properties. When either triphenyl phosphate or dicyclohexyl phthalate is used, plasticizer concentrations of from about 7% to about 15% and preferably from about 9% to 12% have been found to be particularly suitable.

It is thought that any liquid epoxidized olefinic oil may be used in practicing the present invention and that any liquid epoxidized olefinic oil included in the vinyl formulation will flaten out the hardness versus time curve without materially altering the softness of the splint at room temperature or its internal cohesiveness at 165° F., the latter temperature being the approximate upper limit of human tolerance. However, it is preferable that the epoxidized oil have an iodine value of from about 120 to 135 prior to epoxidizing and a maximum iodine value of from about 1.5 to 6 after epoxidizing, the difference representing the number of epoxy groups added to the molecule. It is also preferable that the liquid epoxidized oil resin have the characteristic that when mixed with a vinyl chloride-vinyl acetate copolymer resin having a vinyl chloride content of between about 70% and about 95% at a concentration of 70 parts of epoxy per 100 parts of resin, the resulting vinyl composition has an ASTM stiffness modulus of between about 600 and 1,000 p.s.i. at a temperature of between about 68° F. and 150° F., as such oils have been found to be particularly suitable. Liquid epoxidized oils are commercially identified by manufacturers in terms of the stiffness modulus of vinyl resins compounded with various amounts of the epoxy in question as well as by the viscosity, melting point, and other more familiar properties used to identify commercial compounds. One such epoxidized oil is Flexol JPO which is an epoxidized soybean oil and having a molecular weight of approximately 1,000, an epoxide equivalent of approximately 207, a maximum iodine value of 3.5, a boiling point of 150° C. at 5 mm. of mercury, a viscosity of 365 cps. at 23° C., a saponification number of approximately 181, a flash point of about 600° F., a viscosity at 100° F. of approximately 162 cps., and a specific gravity of about 0.990. A vinyl formulation consisting of 70 parts of the epoxidized olefinic oil per 100 parts vinyl resin has a stiffness modulus of from about 700 to about 800 p.s.i. at a temperature of from about 68° F. to about 150° F. The epoxidized oil should be used only in small amounts, on the order of from about 2 to about 6 and preferably about 4 parts by weight per 100 parts by weight of vinyl resin.

In addition to the components described above, fillers and other agents may be added if they do not substantially modify the hardness versus time curve of the completed splint. For example, it is desirable to add from about 12 to about 20 and preferably about 16 parts by weight of an acrylic polymer such as Acryloid KM–228. This polymer has a viscosity at 10% solids of 270 cps., specific gravity 1.18, melt index 1.49, and a number average molecular weight of approximately 500,000. The addition of the acrylic polymer acts to decrease the brittleness of the splint and therefore increase its impact strength, the same not materially affecting the hardness versus temperature curve of the sheet in the temperature range of interest.

Several specific examples of the invention are described below, however, it is understood they are not to be construed to limit the invention.

EXAMPLE I

A 1000-gram formulation consisting of 72 parts by weight of a medium molecular weight polyvinyl chloride-polyvinyl acetate copolymer resin having a vinyl chloride content of 87%; 8 parts by weight of triphenyl phosphate having a minimum melting point of about 48.5° C.; 3 parts by weight of the liquid epoxidized soybean oil sold as Flexol JPO and previously described; and 16 parts by weight of an acrylate polymer resin Acryloid KM–228 previously described, is mixed in a Banbury mixer for 5 minutes, the maximum temperature reached being from about 220 to about 250° F. The compounded vinyl resin is milled for several minutes at a temperature of 220° F. and sheeted out to form a thin sheet of approximately 120 mils.

The completed sheet is heated in an oven at 165° F. When the sheet is removed from the oven, the Shore D hardness of the same is measured at time intervals of $\frac{1}{10}$ of a minute. The data which is obtained is plotted as curve C on the appended graph. It is found that the splint remains adequate shapable and moldable until the Shore D hardness increases above about 50 to 55, and thus about 30 seconds is available to the physician to cut, shape, and apply the splint to the patient.

The above described procedure is repeated with a vinyl formulation which does not contain the 3 parts by weight of epoxidized oil and which contains 11 parts by weight of triphenyl phosphate instead of the 8 parts by weight of triphenyl phosphate contained in the first formulation. A Shore D hardness versus time curve of the sheet is plotted as curve A on the appended graph.

The above described procedures are again repeated with a vinyl formulation containing 11 parts by weight of the liquid epoxidized oil and containing no solid monomeric plasticizer and the Shore D hardness versus time curve plotted as curve X on the appended graph.

EXAMPLE II

The procedures of Example I are repeated essentially as described therein except that the compounded vinyl resin contains dicyclohexyl phthalate having a melting point of 63° C. instead of triphenyl phosphate. The Shore D hardness versus time curve of a sheet of the composition containing 8 parts by weight dicyclohexyl phthalate and 3 parts by weight of epoxy is plotted as curve D on the appended graph. The Shore D hardness versus time curve of a sheet of the composition containing 11 parts dicyclohexyl phthalate and no epoxidized oil is plotted as curve B on the appended graph.

EXAMPLE III

A compounded vinyl resin having the same formulation as that used in Example I is prepared by mixing the same in a 500 pound capacity Banbury mixer for a contact time of 10 minutes in a 2500 pound per hour capacity continuous system, milling the compounded vinyl on a rubber mill at 200° F. and thereafter calendering the compounded vinyl into 20-mil thick sheets on an inverted L calender. Six of the 20-mil sheets are integrally laminated together under heat and pressure to provide a 120-mil thick sheet.

The Shore D hardness of the completed splints is measured substantially as described above in Examples I and II at various elapsed times after the splint has been removed from the heat source and the results plotted as curve E on the appended graph.

What is claimed is;

1. A thermoplastic composition suitable for forming splints for immobilizing body members which is characterized by hardness, strength, rigidity, and toughness, at room and body temperatures, and by ready moldability at temperatures between 110° F. and 165° F., comprising a vinyl chloride vinyl acetate copolymer resin, a monomeric solid plasticizer, and small amounts of a liquid epoxidized olefinic oil said liquid epoxidized olefinic oil having an iodine value of from about 120 to 135 prior to epoxidizing and a maximum iodine value of from 1.5 to 6 after epoxidizing.

2. The thermoplastic composition of claim 1 in which said liquid epoxidized olefinic oil is present in an amount of from about 2 to about 6 parts by weight per 100 parts by weight of vinyl polymer and in which said epoxidized oil has the property that when compounded with a copolymer of polyvinyl chloride and polyvinyl acetate in which the polyvinyl chloride content is no less than 70% at a concentration of 70 parts by weight of epoxidized oil per 100 parts by weight of vinyl polymer, the resulting compounded vinyl resin has a stiffness modulus of from about 600 to about 800 p.s.i. in the range of temperatures of from about 68° F. to about 150° F.

3. A thermoplastic composition of claim 1 in which said vinyl polymer is a copolymer of vinyl chloride and vinyl acetate having a vinyl chloride content of from about 70% to about 95%.

4. The thermoplastic composition of claim 1 in which said monomeric solid plasticizer is present in an amount of from about 5% to about 25% by weight of the total weight of the vinyl polymer and monomeric solid plasticizer and in which said solid monomeric plasticizer is chosen from the group consisting of triphenyl phosphate and dicyclohexyl phthalate.

5. The thermoplastic composition of claim 1 in which said liquid epoxidized oil is present in an amount of from about 2 to about 6 parts by weight per 100 parts by weight of vinyl polymer and in which said oil has the property that when compounded with a copolymer of polyvinyl chloride and polyvinyl acetate in which the polyvinyl chloride content is no less than 70% at a concentration of 70 parts of oil by weight per 100 parts by weight of vinyl polymer, the resulting compounded vinyl resin has a stiffness modulus of from about 600 to about 800 p.s.i. in the range of temperatures of from about 68° F. to about 150° F.; and in which said vinyl polymer is a copolymer of vinyl chloride and vinyl acetate having a vinyl chloride content of from about 70% to about 95%; and in which said monomeric solid plasticizer is present in an amount of from about 5% to about 25% by weight of the total weight of the vinyl polymer and monomeric solid plasticizer and in which said solid monomeric plasticizer is chosen from the group consisting of triphenyl phosphate and dicyclohexyl phthalate.

6. The thermoplastic composition of claim 5 in which said liquid epoxidized olefinic oil is present in an amount of from about 3 to about 5 parts by weight per 100 parts by weight of vinyl polymer and in which said monomeric solid plasticizer is present in an amount of from about 9% to about 12% by weight of the combined weight of monomeric plasticizer and vinyl polymer.

7. The thermoplastic composition of claim 6 in which said liquid epoxidized olefinic oil is present in an amount of about 4 parts by weight per 100 parts by weight of vinyl polymer and in which said plasticizer is present in an amount of about 11% by weight of the combined weight of the vinyl polymer and monomeric plasticizer.

8. The thermoplastic composition of claim 7 in which said monomeric solid plasticizer is triphenyl phosphate and in which said vinyl polymer has a vinyl chloride content of about 87%.

References Cited

UNITED STATES PATENTS

| 2,385,879 | 10/1945 | Patton | 260—30.6 |
| 2,997,454 | 8/1961 | Leistner et al. | 260—45.8 |
| 3,284,545 | 11/1966 | Cenci et al. | 260—899 |

DONALD E. CZAJA, Primary Examiner

R. A. WHITE, Assistant Examiner

U.S. Cl. X.R.

128—90; 260—30.6, 31.8